US000001227H

United States Statutory Invention Registration [19]

[11] Reg. Number: H1227

Lewis et al.

[43] Published: Sep. 7, 1993

[54] METHOD FOR IMMOBILIZING MIXED WASTE CHLORIDE SALTS CONTAINING RADIONUCLIDES AND OTHER HAZARDOUS WASTES

[75] Inventors: Michele A. Lewis, Naperville; Terry R. Johnson, Wheaton, both of Ill.

[73] Assignee: The United States of America as represented by the Department of Energy, Washington, D.C.

[21] Appl. No.: 744,753

[22] Filed: Aug. 14, 1991

[51] Int. Cl.[5] ..... C21F 9/16

[52] U.S. Cl. ..... 252/628; 210/682; 210/688; 210/679; 423/2; 423/157; 423/179.5; 423/181

[58] Field of Search ..... 252/628; 210/682, 688, 210/679; 423/2, 154, 179.5, 181

[56] References Cited

U.S. PATENT DOCUMENTS

| | | | |
|---|---|---|---|
| 3,380,916 | 4/1968 | Katz et al. | 210/682 |
| 4,448,711 | 5/1984 | Motojima et al. | 502/74 |
| 4,800,042 | 1/1989 | Kurumada et al. | 25/628 |

OTHER PUBLICATIONS

Liquornik et al., "ion Exchange in Molten Salts VI", J. Physical Chemistry, vol. 77, No. 11, 1973, pp. 1398–1400.

Platek & Marinsky, "Ion Exchange in Concentrated Electrolyty Solutions, etc.", vol. 65, pp. 2118–2122.

A. Baten, "Thermal Analysis of Compounds Resulting from the Inclusion of Molten Salts in Intracrystalline Channels of the Synthetic, etc." Ser. Chem. Metal., 40(4), pp. 77–81.

J. E. Battles et al., IFR Pyrochemical Processes Semi-annual Report, Apr.–Sep. 1989, ANL-IFR-129, pp. 39, 41.

J. E. Battles et al., IFR Pryochemical Processes Semi-annual Report, Oct. 1989–Mar. 1990, ANL-IFR-137, pp. 43–44.

J. E. Battles et al., IFR Pyrochemical Processes Semi-annual Report, Apr.–Sep. 1990, ANL-IFR-146, pp. 64–69.

Liquornik et al., "Ion Exchange in Molten Salts . . . III: The Ion-Exchange, etc.", Journal of Phys. Chem., vol. 72, 1968, pp. 4704 to 4705.

Marinsky, "Ion Exchange", Marcel Dekker, Inc. 1969, vol. 2, pp. 44.

Clarke, "Ceramic Materials for the Immobilization of Nuclear Waste", Ann. Rev. Mater. Sci., 1983, 13:191–218.

*Primary Examiner*—Brooks H. Hunt
*Assistant Examiner*—Ngoclan T. Mai
*Attorney, Agent, or Firm*—James W. Weinberger; Robert J. Fisher; William R. Moser

[57] ABSTRACT

The invention is a method for the encapsulation of soluble radioactive waste chloride salts containing radionuclides such as strontium, cesium and hazardous wastes such as barium so that they may be permanently stored without future threat to the environment. The process consists of contacting the salts containing the radionuclides and hazardous wastes with certain zeolites which have been found to ion exchange with the radionuclides and to occlude the chloride salts so that the resulting product is leach resistant.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR IMMOBILIZING MIXED WASTE CHLORIDE SALTS CONTAINING RADIONUCLIDES AND OTHER HAZARDOUS WASTES

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to a method for immobilizing radioactive wastes for permanent disposal. More particularly, the invention relates to a method of immobilizing mixed waste chloride salts containing radionuclides and other hazardous materials for permanent disposal.

The recovery of fissionable materials such as uranium and plutonium from spent nuclear reactor fuels can be carried out by electrorefining method using electrochemical cells of the type described in U.S. Pat. Nos. 4,596,647 and 2,951,793, as well as U.S. Pat. No. 4,880,506. It is the electrorefining method which is being developed for the reprocessing of integral fast reactor (IFR) fuel. In a typical electrorefining cell, an electrolyte consisting of a molten eutectic salt mixture such as KCl and LiCl is used to transport the metal or metals to be purified between electrode solutions. When used to reprocess spent nuclear reactor fuels, the salt mixture becomes contaminated with radionuclides, such as cesium$-^{137}$ and strontium$-^{90}$, hazardous metals such as barium and other species such as sodium and iodine$-^{129}$ and eventually is no longer suitable for use in the electrorefining cell.

Ideally the salt would be decontaminated by removing the heat producing radionuclides, primarily cesium and strontium, and any other metals, e.g. sodium, which could potentially interfere in the operation of the electrorefiner and the purified salt would be recycled back to the electrorefiner. However, the separation of cesium and strontium chloride from the salt is difficult, and since they are large heat producers it would be necessary to dilute them in another matrix material and/or cool them before they could be stored. It is therefore more practical to dispose of the cesium and strontium and any other radionuclides and toxic metal chlorides and iodides along with a portion of the salt matrix. The waste salt containing the cesium and strontium is a high level waste (HLW), and as such must be disposed of in the geologic repository for HLW. This requires that the waste form be leach resistant to prevent an uncontrolled release of the radionuclides and other hazardous chemicals such as barium into the groundwater. Since waste salts are chlorides and are very water soluble, a method for encapsulating and immobilizing the waste salt must be identified.

One problem with developing a waste storage medium is that the waste salt consists primarily of chloride salts of the alkali metals and as such is not readily amenable to treatment using procedures and techniques developed for immobilizing the cesium and strontium in other nuclear waste streams. For instance, the chloride salts cannot be added directly to glass-forming compounds and processed to yield a leach-resistant glass since glasses containing halides ions are relatively water soluble. Therefore, for immobilization in a glass matrix the waste chloride salts must be converted into oxides or other chemical forms compatible with the glass-making process. However, conversion processes are expensive and time-consuming and raise environmental concerns about the off-gases produced by the processes. A mortar matrix has also been considered as a possible waste form for the waste chloride salt. A special mortar was developed to incorporate lithium, potassium, cesium and strontium chloride salts into its structure and thereby immobilize them. However, when irradiated, the water in the mortar was radiolyzed and large quantities of hydrogen gas were generated.

A new matrix for immobilizing waste chloride salts is therefore needed. Zeolites which can be treated with molten salts are potential candidates because of their sorption and ion exchange properties. When some zeolites are treated with molten salts, salt molecules penetrate the cavities and channels of the zeolite and are then said to be occluded. Occluded molecules provide a transfer medium for ion exchange between the cations in the zeolite and those in the bulk salt. A zeolite which has a high selectivity for cesium, strontium and barium would be a promising candidate for an immobilization matrix.

The ion exchange and sorption properties of zeolites in molten salts has been investigated in several studies. Most of the studies, though involved nitrate salts, not chloride salts.

The ion exchange properties of several zeolites have been investigated in molten nitrate salt solutions [C. M. Callahan, J. Inorg. Nucl. Chem., 28, 2743 (1966)]. Callahan reported the distribution coefficients (concentration in the zeolite phase/concentration in the salt phase) for sodium, calcium, potassium, rubidium, cesium and barium between chabazite and three solvents salts, $LiNO_3$, $NaNO_3$ and $KNO_3$. In each solvent salt one cation was preferentially sorbed, i.e., the distribution coefficient for the preferred cation could be as much as 100 times greater than that for the other cations. This study also showed that ion exchange was minimal when $KNO_3$ was the solvent salt. The distribution coefficients of all the solute cations in $KNO_3$ were very small, varying from $<1$ to 8.7, far less than those in $LiNO_3$ and $NaNO_3$ where distribution coefficients could exceed 100.

Ion exchange was investigated between salt occluded sodium A zeolite, $Na_{12}[(AlO_2)_{12}(SiO_2)_{12}].10NaNO_3$, and solutions of silver, lithium, potassium, cesium, thallium, calcium, and strontium in molten $NaNO_3$. It was found that silver and 'presumably' lithium could be completely exchanged with all 22 sodium ions but that exchange with the larger ions was limited.

The occlusion of lithium, sodium and potassium nitrate in the respective forms of zeolite A was also studied, i.e., LiA, NaA and KA. The results were that $LiNO_3$ and $NaNO_3$ were readily occluded but $KNO_3$ was either not occluded at all or occluded to a very limited extent.

Another study by Susic et al [J. Inorg. Nucl. Chem., 33, 2667 (1971)] investigated the salt occlusion and ion exchange properties of zeolite A in molten alkali halides, sulfates and nitrates. This study was primarily concerned with measuring the amount of occluded salt for the various melts. It was reported that 3.5 meq of chloride per gram was occluded when LiCl-KCl eutectic salt was equilibrated with the lithium form of zeolite A (LiA). The report indicated that ion exchange between lithium and potassium did not occur and inferred that LiCl, but not KCl, was occluded by LiA.

None of the studies cited above were directly applicable to the problem of predicting whether any zeolite would sorb cesium, strontium and barium from a complex salt mixture such as IFR waste salt (one consisting primarily of LiCl and KCl with smaller amounts of NaCl) and retain them so that the zeolite with the occluded salt would act as an immobilization matrix for the cesium, strontium and barium as well as for the matrix (lithium, potassium and sodium) chloride salts. In general the prior art teaches that steric factors are very important in ion exchange and salt occlusion in molten salt-zeolite systems. The presence of an excess quantity of a large ion such as potassium salt will cause the exclusion of other large ions such as cesium and barium. Occlusion and hence the desired ion exchange with cesium, strontium and barium will not occur.

BRIEF SUMMARY OF THE INVENTION

We have discovered that, contrary to the teaching of the prior art, treating certain zeolites with molten IFR salt can provide a simple and effective method for encapsulating waste chloride salt containing radionuclides and other hazardous materials such as barium within the aluminosilicate matrix, thereby effectively immobilizing the waste salt so that it can be permanently stored without endangering the environment.

The method of the invention for decontaminating and immobilizing a mixed molten waste chloride salt containing radionuclides and other hazardous materials for permanent disposal comprises contacting the molten salt containing the radionuclides and hazardous material with a zeolite in the sodium or lithium form, said zeolite containing cavities and being selected from the group consisting of zeolite A, mixtures of chabazite and erionite zeolites, and mixtures thereof, maintaining the contact for a period of time sufficient for molten salt to penetrate the cavities of the zeolite, thereby occluding the salt and for the radionuclides and hazardous material in the non-occluded salt to ion exchange with the sodium or lithium in the zeolite or with the occluded ions thereby decontaminating the non-occluded salt, and allowing the zeolite containing the radionuclides and the occluded salt to cool thereby decontaminating the non-occluded salt and immobilizing the waste salt containing radionuclides and hazardous materials.

Preferably any salt adhering to the zeolite is removed before the zeolite is sent to storage. This can be accomplished before the molten salt has cooled by blowing a gas through the zeolite and salt mixture or otherwise forcibly removing the salt from the zeolite. Alternatively, the salt can be removed after cooling by washing the salt from the zeolite with water or other appropriate solvent.

The invention has the advantage over prior art methods for immobilizing waste salts containing radionuclides and other hazardous materials in that no complicated, costly separation steps are necessary to decontaminate the waste salt. The result of the molten salt-zeolite equilibration is a leach resistant aluminosilicate matrix for the barium, cesium and strontium wherein these ions are present as either aluminosilicates or as occluded salt molecules. Any other alkali metal ions or chloride ions sorbed by the zeolite are also immobilized. Thus, by the method of the invention, normally very soluble chloride salts are converted to an insoluble form.

It is therefore one object of the invention to provide a method of immobilizing waste salts containing radionuclides and other hazardous materials.

It is another object of the invention to provide a process for encapsulating waste chloride salts containing radionuclides and other hazardous materials in order to immobilize the radionuclides, the hazardous materials and the soluble chloride salts so that they may be permanently stored without posing a threat to the environment.

Finally it is the object of the invention to provide a method of encapsulating and immobilizing soluble waste chloride salts containing cesium, strontium and barium so that they may be permanently stored without endangering the environment.

DETAILED DESCRIPTION OF THE PREFERRED EMBODIMENT

These and other objects of the invention for encapsulating and immobilizing radioactive cesium, strontium and barium ions contained in a molten waste chloride salt mixture for permanent disposal may be met by contacting the molten waste chloride salt containing the cesium, strontium, barium and other waste salt components with dehydrated zeolite A in the sodium form, said zeolite containing cavities, maintaining the contact for a period of time sufficient for the salt to penetrate the cavities in the zeolite, thereby occluding the salt within the zeolite and for the cesium, strontium, and barium in the non-occluded salt to ion-exchange with the sodium in the zeolite or with cations in the occluded salt, removing the non-occluded salt from the zeolite, and cooling the zeolite containing the cesium, strontium and barium and the occluded salt thereby immobilizing the waste salt for permanent storage.

Contact between the zeolite and the contaminated molten salt may take place by passing the molten salt through a packed column of the dehydrated zeolite, maintaining contact until the cesium, strontium and barium are sorbed by ion-exchanging with the cations in the zeolite or the occluded salt, and collecting the decontaminated salt for recycling back to the process. Alternatively, sufficient molten salt may be added to the dehydrated zeolite to form an occluded salt-zeolite compound which sorbs the cesium, strontium and barium contained in the salt in a batch type process.

The preferred zeolite for use with this process is zeolite A which has been found to be highly selective for cesium, strontium and barium in a chloride salt solution and which also sorbs lithium and potassium to a relatively lesser extent. Zeolite A is also preferred because of its ability to occlude large quantities of chloride salts, even in the presence of high concentrations of potassium in the molten salt. Another suitable zeolite is zeolite Ionsiv TM IE95 which is a mixture of chabazite- and erionite-type zeolites. This zeolite has good selectivity for cesium and occludes less salt than zeolite A. Because of its lower selectivity for barium and strontium, it may be preferable to use a mixture of zeolite IE95 and zeolite A. Such a mixture may be used when it is desired to minimize the amount of occluded salt. Both zeolites form very leach resistant salt occluded zeolite compounds when they sorb salt molecules.

Actual IFR waste salt will contain, in addition to the cesium and strontium, comparatively small amounts of other radionuclides such as the rare earths and iodide. It may be possible to use zeolites A or IE95 to immobilize them, but other zeolites may prove more suitable because of steric and charge density factors. Iodide ion is larger than cesium and the rare earths cations are normally trivalent.

The temperature of the molten salt must be sufficient to maintain the salt in a liquid state so ion exchange of the radionuclides can take place and so that the salt can penetrate into the cavities of the zeolite. Generally a temperature of about 375° C. will provide sufficient liquidity for the salt to flow into the zeolite. Preferably, temperatures over about 600° C. are to be avoided since they may result in destruction of the zeolite.

Preferably the zeolite is dehydrated before contact is made with the salt. This is done to minimize the amount of water in the final product, since water may radiolyze during storage of the radioactive media producing hydrogen gas. The zeolites can be easily dehydrated with a heated inert gas purge or vacuum degassing.

The following examples are given to illustrate the invention and are not to be taken as limiting the scope of the invention which is defined by the appended claims.

EXAMPLE I

The procedures given below were used for the following Examples. The experiments were run at 400°±25° C. in an argon atmosphere glove box. The composition of the simulated IFR waste salt was 92.5 wt % LiCl-KCl eutectic salt, 5 wt % NaCl, 1 wt % CsCl, 1 wt % $BaCl_2$ and 0.5 wt % $SrCl_2$. The zeolites were dehydrated by heating the zeolite to 350° C. with a gaseous purge of dry nitrogen.

The ion exchange properties of several zeolites, A, IE95, mordenite, clinoptilolite, and X were studied as follows. About 12 g of each of the various zeolites, having a nominal particle size of about 2 microns, were packed into a column and contacted with about 35 g of simulated IFR waste salt at 400°±25° C. The molten salt was allowed to filter through each column under gravity for 2–4 days. Salt which flowed through the entire length of the column was collected. After several grams of salt were collected, the experiments were terminated. The column and the salt in the collection crucible were quickly cooled to room temperature. The zeolite was washed to remove adhering surface salt, dried and then analyzed. Inductively coupled plasma spectroscopy (ICP) was used to analyze for barium, lithium, potassium, silicon, sodium and strontium. Atomic emission spectroscopy was used to analyze for cesium. The compositions of the filtered salt samples from the various runs and the composition of the starting salt are given in Table 1 below.

TABLE 1

Composition of Salt Filtered through Various Zeolite Columns and Simulated IFR Waste Salt

| Zeolite in Column | Concentration in Filtered Salt (wt %) | | | | | |
|---|---|---|---|---|---|---|
| | Ba | Cs | K | Li | Na | Sr |
| A | 0.001 | <0.001 | 26.5 | 5.00 | 6.36 | <0.001 |
| IE95 | 0.945 | 0.053 | 18.6 | 6.25 | 4.80 | 0.385 |
| Mordenite | 1.00 | 0.07 | 20.2 | 6.25 | 6.49 | 0.469 |
| Clinoptilolite | 0.659 | 0.53 | 18.8 | 6.19 | 5.25 | 0.334 |
| Starting Salt Composition | 0.64 | 0.75 | 24.0 | 7.15 | 1.80 | 0.26 |

The data demonstrate that zeolite A preferentially sorbs barium, cesium and strontium since the salt which passed through the zeolite A column contained essentially none of these ions. However, the salt which flowed through the IE95, mordenite and clinoptilolite columns, contained more barium and strontium than the starting salt and less potassium and cesium than the starting salt. This indicates that these zeolites had a lower selectivity for the divalent ions than for potassium and cesium. The sodium concentration is higher in all the filtered salt samples than in the starting salt. This indicated that the sodium in the various zeolites has been exchanged with cations in the salt.

EXAMPLE II

The various zeolites from Example I were analyzed to determine their barium, cesium and strontium content. The analytical results for samples, taken from the middle of the zeolite column, are given in Table 2 below. Also included in Table 2 are the concentrations of lithium, potassium and sodium.

TABLE 2

Composition of Several Zeolites Treated with Simulated IFR Waste Salt

| Zeolite | Concentration (wt %) | | | | | |
|---|---|---|---|---|---|---|
| | Ba | Cs | K | Li | Na | Sr |
| A | 1.40 | 2.0 | 7.42 | 4.88 | 0.73 | 0.58 |
| | 1.41 | 1.8 | 7.81 | 5.30 | 0.80 | 0.37 |
| | 1.38 | 1.8 | 7.79 | 5.25 | 0.79 | 0.36 |
| IE95[a] | 0.72 | 1.9 | 9.84 | 0.49 | 0.41 | 0.28 |
| Mordenite | 0.38 | 1.7 | 7.61 | 0.02 | 0.17 | 0.09 |
| Clinoptilolite | 0.18 | 1.1 | 8.27 | 1.21 | 0.51 | 0.18 |
| X | 1.32 | 0.2 | 6.73 | 1.77 | 2.83 | 0.62 |

[a]A mixture of chabazite and erionite marketed by Union Carbide as Ionsiv TM IE95.

Note that the sum of the barium, cesium and strontium concentrations in the salt occluded zeolite A is higher than that of any of the other zeolites. Note also that zeolite IE95 is the only other zeolite able to sorb significant concentrations of the ions of interest.

EXAMPLE III

The salt occlusion properties of the zeolites used in the preceding Examples were measured by a determination of their chloride ion concentration using pyrohydrolysis and ion chromatography. These date are given in Table 3 below.

TABLE 3

CONCENTRATION OF CHLORIDE IONS IN TREATED WITH SIMULATED IFR WASTE SALT

| zeolite | $Cl^-$ (wt %) |
|---|---|
| A | 16.9–19.2 |
| IE95 | 3.9 |
| Mordenite | 0.8 |
| Clinoptilolite | 6.6 |
| X | 1.3 |

As can be seen, zeolite A contained the largest concentration of chloride ion after treatment with the molten salt than any of the other zeolites. The 16.9 to 19.2 wt % measured is equivalent to 4.8 to 5.3 meq chloride ion per gram of salt occluded zeolite. IE95 and clinoptilolite occluded moderate amount of chloride ion but mordenite and zeolite X occluded practically none.

EXAMPLE IV 12 g of dehydrated zeolite A in the sodium form (NaA) with a nominal particle size of 2 microns was contacted with about 35 g of simulated IFR waste salt at 400°±25° C. as described in Example 1. The zeolite was washed, dried and analyzed. The results of the analyses for a single sample taken from the top ½ inch of the column are reported in Table 4 below. The concentration of barium, cesium and strontium are higher at the top of the column than in the middle as in Example II. This is further evidence of an ion exchange process. The relative selectivity of zeolite A for the components of the salt can be seen by comparing the concentration of the cations (in mole %) in the salt occluded zeolite and in the simulated IFR waste salt as shown in Table 4. Also included in the table is the composition of anhydrous zeolite NaA.

TABLE 4

| Sample | Concentration Units | Concentration of Metal Ions: Metal Ions Ba | Cs | K | Li | Na | Sr |
|---|---|---|---|---|---|---|---|
| Salt | wt % | 4.83 | 2.7 | 6.58 | 4.30 | 0.49 | 3.18 |
| Occluded Zeolite | meq/g[a] | 0.70 | 0.20 | 1.70 | 6.20 | 0.21 | 0.73 |
| | mole %[b] | 3.9 | 2.2 | 18.7 | 68.9 | 2.3 | 4.0 |
| Anhydrous NaA | wt % | | | | | 16.2 | |
| | meq/g[c] | | | | | 7.00 | |
| Simulated IFR Waste Salt | wt % | 0.64 | 0.75 | 24.0 | 7.15 | 1.80 | 0.26 |
| | mole % | 0.27 | 0.32 | 35.3 | 59.5 | 4.5 | 0.17 |

[a]g refers to gram of salt occluded zeolite. Calculated by dividing the amount of each cation in one gram of salt occluded zeolite by the equivalent weight.
[b]Calculated by dividing the number of mmoles/g for each cation by the total number of mmoles of cations, 9.03; zeolite component is excluded.
[c]g refers to gram of anhydrous zeolite.

These data show that NaA functions as an effective ion exchanger for cesium, strontium and barium in molten simulated IFR waste salt sorbing from 2–4 mol % of each. Note also that most of the sodium initially present in the NaA was replaced in the salt occluded zeolite by the other metal ions in the molten salt.

EXAMPLE V

The salt which filtered through the column of zeolite A in Example IV was analyzed. Decontamination factors (concentration in/concentration out) were calculated from this analysis and the analysis of the starting salt. These are given in Table 5 below.

TABLE 5

| | Concentration of Metal Ions in Filtered and Simulated IFR Waste Salt (wt %): Ba | Cs | K | Li | Na | Sr |
|---|---|---|---|---|---|---|
| Filtered Salt | 0.001 | <0.001 | 26.5 | 5.00 | 6.36 | <0.001 |
| IFR Salt | 0.64 | 0.75 | 24.0 | 7.15 | 1.80 | 0.26 |
| Decontamination Factor | 640 | >750 | 0.9 | 1.4 | 0.3 | >260 |

The decontamination factors for barium, cesium and strontium are about 640, >750 and >260 respectively. The decontamination factors for potassium and lithium are 0.9 and 1.5 respectively, i.e., the concentration of potassium is slightly higher in the filtered salt than in the simulated IFR waste salt while the concentration of lithium is lower.

EXAMPLE VI

Partial evidence for the occlusion of salt molecules was obtained from a determination of the chloride ion concentration of the salt occluded zeolites as in Example III. Confirmatory evidence for salt occlusion in zeolite A was obtained from an analysis of the cation concentration of salt occluded zeolite A. The total concentration of cations was obtained by summing the number of milliequivalents (meq) for all the metal ions, or 9.74 meq/g of salt occluded zeolite as in Example IV. The silicon concentrations in anhydrous NaA (19.8 wt %) and in the salt occluded zeolite (13 wt %) were used to measure the amount of anhydrous zeolite present in the salt occluded zeolite compound, 13/19.8 or about 66 wt %. In 0.66 g of anhydrous zeolite NaA, there were 4.65 meq of sodium. The number of excess cations was 9.75–4.65 or 5.10 meq/g. Thus, both the cation and chloride analyses showed that 5.0±0.3 meq of salt was occluded per gram of the salt occluded zeolite compound.

TABLE 6

| Sample | Concentrations of Metal Ions and Silicon wt % (meq/g): Ba | Cs | K | Li | Na | Sr | Si |
|---|---|---|---|---|---|---|---|
| Salt Occluded Zeolite | 1.45 (0.22) | 2.0 (0.15) | 7.36 (1.90) | 4.89 (7.00) | 0.73 (0.32) | 0.661 (0.16) | 13.0 |

EXAMPLE VII

Samples of the washed and dried occluded salt-zeolite compound were leached in deionized water for periods of time ranging from 1 day to 42 days. After the leach period, the mixture was filtered with a 0.2μ filter. The leachate was acidified and analyzed. The zeolite was dried and analyzed. The details of the analyses for two samples consisting of a 50-50 wt % mixture of zeolite A and IE95 are given in Table 7. The leach periods for these two experiments were 1 day and 42 days.

TABLE 7

| Sample | Zeolite (g) | Leach Test Results: Duration (d) | Ba | Cs | Sr |
|---|---|---|---|---|---|
| | | | Concentration (wt %) | | |
| 1 | 0.216 | 1 | 2.00 | 1.8 | 0.92 |
| 2 | 0.233 | 42 | 1.65 | 1.8 | 0.71 |
| | Leachate (ml) | | Concentration (μg/ml) | | |
| 1 | 21.65 | 1 | <0.02 | 0.1 | 0.01 |
| 2 | 23.36 | 42 | <0.02 | 0.07 | 0.015 |
| | | | Amount Released (%) | | |
| 1 | | | <0.01 | 0.06 | 0.01 |
| 2 | | | <0.01 | 0.04 | 0.02 |

The percentages of barium, cesium and strontium released in the one day test were <0.01, 0.06 and 0.01, respectively and in the 42 day test, they were <0.01, 0.04 and 0.02, respectively. These release rates are significantly smaller than the 2.3% reported in a previous study. [M. Liquornik and Y. Marcus, Israel J. Chem 6, 115 (1968)]. Thus, both zeolites A and IE95 equilibrated with molten simulated IFR waste salt act as a particularly good leach resistant or immobilization matrix for the barium, cesium and strontium. Other experiments with zeolite A alone yielded similar results.

As can be seen from the preceding discussion and Examples, the method of the invention provides a safe and effective manner in which to immobilize highly soluble waste chloride salts containing radioactive nuclides to enable the salts to be sent to permanent storage without fear of any detrimental effect on the environment.

The embodiment of the invention in which an exclusive property or privilege is claimed is defined as follows:

1. A method of decontaminating and immobilizing molten waste chloride salts containing radionuclides and barium for permanent disposal comprising:

contacting the molten salt containing the radionuclides and barium with a zeolite in a form selected from the group consisting of sodium and lithium, said zeolite containing cavities and being selected from the group consisting of zeolite A, mixtures of chabazite and erionite zeolites, and mixtures thereof, maintaining the contact for a period of time sufficient for molten salt to penetrate the cavities of the zeolite, thereby occluding the salt and for the radionuclides and barium in the non-occluded salt to ion exchange with the sodium or lithium in the zeolite thereby decontaminating the non-occluded salt, and allowing the zeolite containing the radionuclides and the occluded salt to cool thereby decontaminating the non-occluded waste salt and immobilizing the waste salt containing radionuclides and other hazardous material.

2. The method of claim 1 wherein the zeolite is zeolite A.

3. The method of claim 2 wherein the radionuclides are one or more members selected from the group consisting of cesium, and strontium.

4. The method of claim 3 wherein the chloride salt consists of lithium chloride, potassium chloride.

5. The method of claim 4 wherein the chloride salt also contains sodium chloride.

6. The method of claim 5 wherein any excess salt is removed from the zeolite before the salt is cooled.

7. The method of claim 5 wherein any excess salt is removed from the zeolite after the salt is cooled by washing the zeolite containing the exchanged radionuclides and the occluded salt with water.

8. The method of claim 5 wherein the temperature of the molten salt is between 375° and 600° C.

9. A method of immobilizing and decontaminating a waste chloride salt mixture of lithium and potassium containing sodium, cesium, strontium, and barium in addition to other radionuclides and hazardous materials comprising:

contacting the molten waste salt mixture with dehydrated zeolite A in the sodium form, said zeolite containing cavities, maintaining the contact for a period of time sufficient for molten salt to penetrate the cavities of the zeolite, thereby occluding the salt and for the cesium, strontium and barium in the non-occluded salt to ion exchange with the sodium in the zeolite, thereby decontaminating the non-occluded salt, removing the unoccluded salt from the zeolite, and cooling the zeolite containing the cesium, strontium and barium and the occluded salts thereby decontaminating the non-occluded salt and immobilizing the chloride salts containing cesium, strontium and barium.

* * * * *